US007811963B2

(12) United States Patent
Klaver et al.

(10) Patent No.: US 7,811,963 B2
(45) Date of Patent: *Oct. 12, 2010

(54) ELONGATED SHAPED PARTICLES USE AS A CATALYST OR SUPPORT THEREOF

(75) Inventors: Hilbrand Klaver, Amsterdam (NL); Carolus Matthias Anna Maria Mesters, Amsterdam (NL); Gerardus Petrus Lambertus Niesen, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1301 days.

This patent is subject to a terminal disclaimer.

(21) Appl. No.: 10/533,775

(22) PCT Filed: Nov. 3, 2003

(86) PCT No.: PCT/EP03/50786

§ 371 (c)(1),
(2), (4) Date: May 4, 2005

(87) PCT Pub. No.: WO2004/041430

PCT Pub. Date: May 21, 2004

(65) Prior Publication Data
US 2006/0111455 A1    May 25, 2006

(30) Foreign Application Priority Data
Nov. 4, 2002    (EP)    .................................. 02257619

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ........................ 502/326; 502/258; 502/259; 502/260; 502/261; 502/262; 502/263; 502/327; 502/332; 502/333; 502/334; 502/335; 502/336; 502/337; 502/338; 502/339; 502/350; 502/344; 502/415; 502/439; 502/527.12; 502/527.17

(58) Field of Classification Search ................. 502/258, 502/259, 260, 261, 262, 263, 326, 327, 332, 502/333, 334, 335, 336, 337, 338, 339, 350, 502/355, 415, 439, 527.12, 527.17
See application file for complete search history.

(56) References Cited

U.S. PATENT DOCUMENTS 3,764,565 A    10/1973   Jacobs et al. ................. 252/470

(Continued)

FOREIGN PATENT DOCUMENTS

AU                698392          10/1998

(Continued)

OTHER PUBLICATIONS

International Search Report dated Mar. 16, 2004.
I. Naka and A. de Bruijn, J. Japan Petrol. Inst., vol. 23, No. 4, 1980, pp. 268-273.

*Primary Examiner*—Cam N Nguyen

(57) ABSTRACT

An elongated-shaped particle having two protrusions; each extending from and attached to a central position, wherein the central position is aligned along the longitudinal axis of the particle, the cross-section of the particle occupying the space encompassed by the outer edges of six circles around a central circle, in which each of the six circles touches two neighboring circles and two alternating circles are equidistant to the central circle and may be attached to the central circle, and the two circles adjacent to the two alternating circles (but not the common circle) touching the central circle, minus the space occupied by the four remaining outer circles and including four remaining interstitial regions.

13 Claims, 2 Drawing Sheets

U.S. PATENT DOCUMENTS

| | | | |
|---|---|---|---|
| 4,028,221 A | 6/1977 | Sze et al. | 208/8 |
| 4,116,817 A * | 9/1978 | Frayer et al. | 208/210 |
| 4,116,819 A * | 9/1978 | Frayer et al. | 208/216 R |
| 4,118,310 A * | 10/1978 | Frayer et al. | 208/210 |
| 4,133,777 A * | 1/1979 | Frayer et al. | 502/309 |
| 4,328,130 A * | 5/1982 | Kyan | 502/100 |
| 4,342,643 A * | 8/1982 | Kyan | 208/134 |
| 4,391,740 A * | 7/1983 | Gibson | 502/305 |
| 4,394,303 A * | 7/1983 | Gibson | 502/305 |
| 4,489,173 A * | 12/1984 | Gibson | 502/313 |
| 4,517,077 A | 5/1985 | Clements | 208/216 R |
| 4,606,815 A * | 8/1986 | Gibson | 208/210 |
| 4,625,001 A | 11/1986 | Tsubakimoto et al. | 526/88 |
| 4,628,001 A | 12/1986 | Sasaki et al. | 428/367 |
| 4,645,754 A | 2/1987 | Tamura et al. | 502/527 |
| 4,673,664 A | 6/1987 | Bambrick | 502/439 |
| 4,975,032 A | 12/1990 | Arai et al. | 418/150 |
| 6,005,121 A | 12/1999 | Ebner et al. | 549/259 |

FOREIGN PATENT DOCUMENTS

| | | |
|---|---|---|
| DE | 3315105 | 11/1983 |
| EP | 0218147 | 4/1987 |
| EP | 0220933 | 5/1987 |
| EP | 127.220 B1 | 1/1988 |
| EP | 0428223 | 5/1991 |
| EP | 455.307 A1 | 11/1991 |
| EP | 464.633 A1 | 1/1992 |
| EP | 0510700 | 4/1992 |
| EP | 510.770 A2 | 10/1992 |
| EP | 678.331 B1 | 3/1999 |
| GB | 1.446.175 | 8/1976 |
| JP | 55119445 | 9/1980 |
| WO | 95/23765 | 9/1995 |
| WO | 99/34917 | 7/1999 |
| WO | 03/013725 | 2/2003 |

* cited by examiner

US 7,811,963 B2

ELONGATED SHAPED PARTICLES USE AS A CATALYST OR SUPPORT THEREOF

PRIORITY CLAIM

The present application claims priority on European Patent Application 02257619.3 filed Nov. 4, 2002.

FIELD OF THE INVENTION

The present invention relates to a new class of elongated shaped particles, which particles may be employed in a wide variety of duties, catalytic or non-catalytic.

The invention further relates to a catalyst or catalyst precursor, which catalyst or catalyst precursor is supported on a specifically shaped carrier, to a process to prepare a catalyst or catalyst precursor from a shapeable dough and to the die-plate used for the preparation of an extruded catalyst or catalyst precursor.

The invention in addition relates to the use of the catalyst in mass-transfer or diffusion limited reactions, as well as to the products prepared by using the catalyst.

The invention further relates to a process to prepare fuels and base oils, by hydrogenation, hydroisomerisation and/or hydrocracking of the hydrocarbons which can be prepared in a Fischer-Tropsch process using the catalyst.

BACKGROUND OF THE INVENTION

In the past a tremendous amount of work has been devoted to the development of particles, in particular catalytically active particles, for many different processes. There has also been a considerable effort to try to understand the advantages and sometimes disadvantages of effects of shape when deviating from conventional shapes such as pellets, rods, spheres and cylinders for use in catalytic as well as non-catalytic duties.

Examples of further well-known shapes are rings, cloverleafs, dumbells and C-shaped particles. Considerable efforts have been devoted to the so-called "polylobal"-shaped particles. Many commercial catalysts are available in TL (Trilobe) or QL (Quadrulobe) form. They serve as alternatives to the conventional cylindrical shape and often provide advantages because of their increased surface-to-volume ratio which enables the exposure of more catalytic sites thus providing more active catalysts.

An example of a study directed to effects of different shapes on catalytic performance can be found in the article by I. Naka and A. de Bruijn (J. Japan Petrol. Inst., Vol. 23, No. 4, 1980, pages 268-273), entitled "Hydrodesulphurisation Activity of Catalysts with Non-Cylindrical Shape". In this article experiments have been described in which non-cylindrical extrudates with cross-sections of symmetrical quadrulobes, asymmetrical quadrulobes and trilobes as well as cylindrical extrudates with nominal diameters of 1/32, 1/16 and 1/12 inch were tested in a small bench scale unit on their hydrodesulfurization activity (12% wt $MoO_3$ and 4% wt CoO on gamma alumina). It is concluded in this article that the HDS activity is strongly correlated with the geometrical surface-to-volume ratio of the catalyst particles but independent of catalyst shape.

In EP-0,220,933, it is described that the shape of quadrulobe-type catalysts is important, in particular with respect to a phenomenon known as pressure drop. From the experimental evidence provided it appears that asymmetric quadrulobes suffer less from pressure drop than the closely related symmetrical quadrulobes. The asymmetrically shaped particles are described in EP-0,220,933 by way of each pair of protrusions being separated by a channel which is narrower than the protrusions to prevent entry thereinto by the protrusions of an adjacent particle. It is taught in EP-0,220,933 that the shape of the particles prevents them from "packing" in a bed causing the overall bulk density of the catalyst bed to be low.

EP-0,428,223 discloses that the catalyst particles may be in the form of cylinders; hollow cylinders, for example cylinders having a central hollow space which has a radius of between 0.1 and 0.4 of the radius of the cylinder; straight or rifled (twisted) trilobes; or one of the other forms disclosed in U.S. Pat. No. 4,028,221. Trilobe extrudates are said to be preferred.

EP-0,218,147 discloses a helical lobed, polylobal extrudate particle having the outline shape of three or four strands helically wound about the axis of extrusion along the length of the particle and its use as a catalyst or catalyst support, in particular as a catalyst or catalyst support in hydrotreating operations. The helical shape of the catalyst is said to reduce the pressure drop across fixed bed reactors through which liquid and/or gas reactants are passed. In this way, smaller catalyst particles can be employed in a given reactor design to meet the pressure drop requirements.

Since many of the findings in the art are conflicting and pressure drop problems continue to be in existence, especially when surface-to-volume ratios are increased by reducing particle size, there is still considerable room to search for alternative shapes of (optionally catalytically active) particles which would diminish or even prevent such problems. When using a process employing a fixed bed of catalyst particles, a major consideration in the design of the process is the pressure drop through the catalyst bed. It is most desirable that the pressure drop should be as low as possible. However, it is well reported in the art that, for a given shape of catalyst particles, as the size of the catalyst particles in a fixed bed is reduced, there is a corresponding increase in pressure drop through the catalyst bed. Thus, there exists a conflict in the design of fixed catalysts beds when trying to achieve a satisfactory level of catalyst efficiency whilst keeping the pressure drop through the bed to a minimum. In addition to the above, the catalyst particles should be sufficiently strong to avoid undesired attrition and/or breakage. Especially in fixed beds the bulk crush strength should be (very) high, as beds are used in commercial reactors of up to 15 meters high. Especially at the lower end of the bed the pressure is very high and the strengths of the catalyst particles plays an important part. This is an additional complication in designing further improved catalyst particles. A still further complicating element is the manufacturing process of catalyst particles. There is a need for a fast, relatively inexpensive and suitable manufacturing process which will enable the production of catalyst particles in large quantities. One example of such a commercially available manufacturing process is an extrusion process. It is taught in the prior art that the efficiency of a catalyst in general increases as the size of the catalyst particle decreases. Further, catalysts should show a high stability, i.e. deactivation should be very low.

SUMMARY OF THE INVENTION

The invention is directed to an elongated shaped particle comprising two protrusions each extending from and attached to a central position, wherein the central position is aligned along the longitudinal axis of the particle, the cross-section of the particle occupying the space encompassed by the outer edges of six circles around a central circle, wherein each of the six circles touches two neighboring circles and two alternating circles are equidistant to the central circle and may be attached to the central circle, and the two circles adjacent to the two alternating circles (but not the common circle) touching the central circle, minus the space occupied by the four remaining outer circles and including four remaining interstitial regions.

It has now surprisingly been found that specifically shaped particles offer unexpected and sizeable advantages compared with conventional "trilobal", cylindrical or quadrulobal shaped particles, both in catalytic and non-catalytic duty.

DETAILED DESCRIPTION OF THE INVENTION

It is known that the type of reactions which require solid porous catalyst particles are often limited by the rate of diffusion of the reactants into the catalyst particle or by the rate of diffusion of the evolving products out of the catalyst particle. Accordingly, catalyst particles which display a high surface-to-volume ratio are advantageous.

It has been found that the catalyst particles according to the present invention have a larger surface-to-volume ratio than corresponding conventional cylindrical or "trilobal" particles of similar size and suffer substantially less from pressure drop than such corresponding conventional cylindrical or "trilobal" particles.

The shaped catalyst particles of the present invention can be formed of any suitable material provided it is capable of being processed in such a way that their intended shape is obtained. Methods of preparing such shapes include pressing, extruding or otherwise forcing a granular or powdered catalyst or catalyst precursor material into various shapes under certain conditions, which will ensure that the particle retains the resulting shape, both during reaction as well as during regeneration.

Preferred catalyst particles according to the present invention have a cross-section in which the two remaining alternating circles have diameters in the range between 0.74 and 1.3 times the diameter of the central circle, preferably between 0.87 and 1.15 times the diameter of the central circle.

More preferred catalyst particles according to the present invention are those having a cross-section in which the two remaining alternating circles have the same diameter as the central circle, with most preference given to particles having a cross-section in which the two remaining alternating circles are attached to the central circle.

Figure 1:
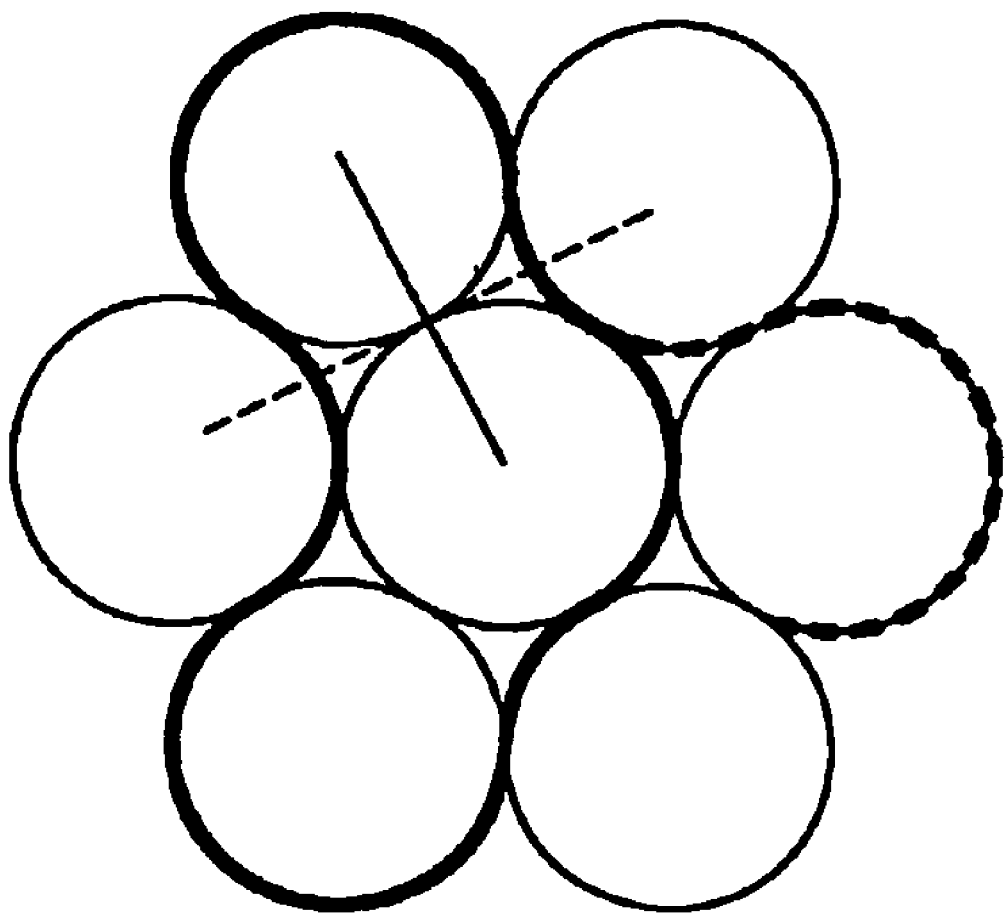
FIG. 1 shows a cross-sectional view of an embodiment of the invention.

In FIG. 1 a cross-sectional view of the preferred particles according to the invention has been depicted. The surface of the cross-sectional shape is indicated by the solid line. It will be clear from this figure (depicting the cross-section of the preferred particles) that in the concept of six circles of equal size aligned around a central circle of the same size each outer circle borders its two neighbor circles and the central circle, and two alternating circles are equidistant to the central circle and may be attached to the central circle. The two circles adjacent to the two alternating circles (but not the common circle) touch the central circle.

The cross-section of the preferred particles is built up from three circles (the central circle and two alternating outer circles) together with the four areas (3) formed by the inclusions of the central circle and five outer circles, among which the two alternating outer circles, the two alternating outer circles each touching two adjacent outer circles, and minus the space occupied by the four remaining circles. For the purpose of this invention, the inclusions of the central circle and five outer circles, among which the two alternating outer circles are referred to as "interstitial areas". The two remaining alternating outer circles are equidistant to the central circle.

The term "equidistant" as used herein refers to the circumstance that the distance between the center of the central circle to the center of one of the outer circles is equal to the distance between the center of the central circle to the center of either one of the other remaining outer circles.

For the purpose of this application the term "equidistant" may comprise deviations up to 20% of the distance, preferably up to 10%, more preferably up to 5%. In the most preferred embodiment there is no deviation. The circumference of the preferred shaped particles according to the present invention is such that it does not contain sharp corners.

The two protrusions and the central position together form the cross-section of the shaped particle. The main part of each protrusion is formed by one of the alternating circles. The main part of the central position is formed by the central circle. The interstitial areas are divided between the central position and the protrusion by a line perpendicular to the line connecting the center point of the central circle and the center part of the alternating circle. The perpendicular line crosses the connecting line at a point exactly in the middle between the two center points (see FIG. 1). The present invention does not relate to elongated shaped particles or catalyst or catalyst precursors in which any of the central circles has three or more protrusions. Thus, trilobe, quadrulobe etc. are excluded.

The shaped particles of the present inventions include particles comprising one to four additional protrusions, preferably one to two additional protrusions, each attached to an existing endstanding protrusion as defined in claim 1, the additional protrusion being defined in the same way as in claim 1, the existing endstanding protrusion becoming the new central circle, the original central circle becoming the other protrusion. A cross section of the particles including additional protrusions is depicted in FIG. 1b. These additional protrusions are not attached to any central position, i.e. multilobal structures as trilobes are not included.

An alternative way of describing the preferred particles of the present invention is to depict the cross-section of these particles as being built up from three or more circles, in which the angle between the two lines connecting the centers of three adjacent circles is between 90° and 180° or between 180° and 270°; preferably between 110° and 150° or between 210° and 250°, more preferably 120° or 240°.

The shaped particles according to the invention can comprise particles having only one additional protrusion, or particles having at least two additional protrusions, or mixtures of both types of particles.

It will be clear that minor deviations from the shape as defined are considered to be within the scope of the present invention. In the case where the catalyst or catalyst precursor of the present invention is prepared by an extrusion process, die-plates are used. It is known to those skilled in the art to manufacture die-plates having one or more holes in the shape of the particles according to the present invention and which tolerances can be expected in practice when producing such die-plates. In this respect it is observed that the pressure release immediately after extrusion may result in deformation of the extrudates. Usually the minor deviations are within 10%, preferably within 5%, more preferably within 2% with respect to the diameter of the circles in the ideal shape as defined in the present invention.

After a typical process of preparation of the catalyst or catalyst precursor particles of the invention, between 10% and 100% of the number of particles produced should have a nominal diameter with a deviation of less than 5% of the ideal shape as defined in the present invention. Preferably, at least 50% of the catalyst particles should have a nominal diameter with a deviation of less than 5% of the ideal shape as defined in the present invention.

It is possible to produce catalyst particles according to the present invention, which also contain one or more holes along the length of the particles. For instance, the particles can contain one or more holes in the area formed by the central cylinder (the central circle in the cross-section given in FIG. 1) and/or one or more holes in one or more of the alternating cylinders (the alternating circles in the cross-section given in FIG. 1).

The presence of one or a number of holes causes an increase of the surface to volume ratio which in principle allows exposure of more catalytic sites and, in any case, more exposure to incoming charges which may work advantageously from a catalytic point of view. Since it becomes increasingly difficult to produce hollow particles as their size becomes smaller it is preferred to use porous particles without holes when smaller sizes are desired for certain purposes.

It has been found that the voidage of the catalyst particles according to the present invention is well above 50% (voidance being defined as the volume fraction of the open space present in a bed of particles outside the particles present, i.e. the volume of the pores inside the particles are not included in the voidage). The particles used in the experiment to be described hereinafter had a voidage of typically 58% which is substantially above that of the comparative "trilobal" particle, the voidage of which amounted to just over 43%.

The catalyst particles according to the present invention can be described as having a length/diameter ratio (L/D) of at least 1.

The diameter is defined as the diameter of one of the circles depicted in FIG. 1.

Figure 2:
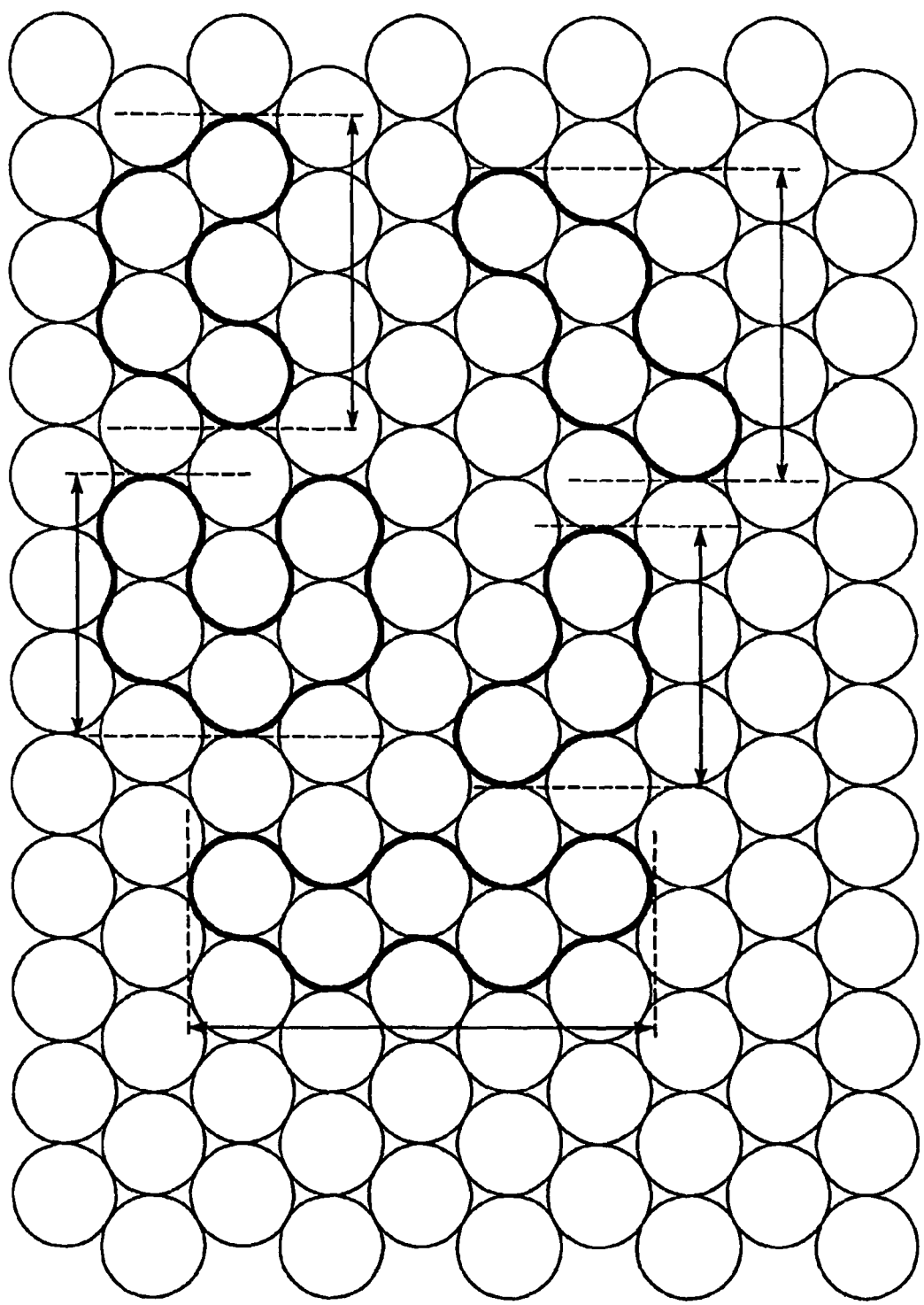
FIG. 2 shows a cross-sectional view of another embodiment of the invention.

The length of the particles comprising one to four additional protrusions is defined as the distance between the tangent line that touches a first protrusions and a line parallel to this tangent line that touches a second protrusion, the second protrusion being the protrusion farthest away from the first protrusion, see FIG. 2.

The particles according to the present invention can have a L/D in the range between 1 and 25. Preferably, the particles according to the present invention have a L/D in the range between 1.5 and 20, more preferably in the range between 2 and 10. For example, the particles used in the experiment to be described hereinafter had a L/D of about 2.5.

The length of the particles in accordance with the present invention is suitably in the range between 1 and 25 mm, preferably in the range between 2 and 20 mm, depending on the type of application envisaged.

The shaped particles according to the invention are suitably made from a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania, especially $TiO_2$. These particles may contain one or more catalytical active metals or precursors therefor.

In one embodiment of the present invention, the shaped particles may be used as carriers for Fischer-Tropsch catalysts.

The preparation of hydrocarbons from a gaseous mixture comprising carbon monoxide and hydrogen by contacting the mixture with a catalyst at elevated temperature and pressure is known in the literature as the Fischer-Tropsch synthesis.

Catalysts used in the Fischer-Tropsch synthesis often comprise one or more metals from Group VIII of the Periodic Table of the Elements, optionally in combination with one or more metal oxides and/or other metals as promoters.

It is most desirable to employ a highly efficient catalyst. In terms of the Fischer-Tropsch process, a highly efficient catalyst is one which exhibits not only a high level of activity for the conversion of carbon monoxide and hydrogen to hydrocarbons, but also a high degree of selectivity to higher molecular hydrocarbons, in particular $C_5$ hydrocarbons and larger, henceforth referred to as "$C_5$+ hydrocarbons".

The Fischer-Tropsch synthesis may be carried out using a variety of reaction regimes, for example a fluidized bed regime or a slurry bed regime.

Simulations show when using the shaped particles of the present invention as catalyst carriers in the Fischer-Tropsch hydrocarbon synthesis, the CO and/or $H_2$ diffusion limitation is considerably less compared to the case where (conventional) trilobe shapes are used, leading to a better selectivity.

The improved performance when using the extrudate shapes of the present invention as catalyst carriers is expected to extend to other reactions which are internal-mass-transfer limited.

An important advantage when using the shaped particles of the present invention as catalyst carriers in the Fischer-Tropsch hydrocarbon synthesis is the considerable reduction in the pressure drop through the reactor bed. This reduction in pressure drop offers substantial advantages, since it is most desirable that the pressure drop should be as low as possible.

In addition, the extruded shaped particles of the present invention display an improved crush strength compared to trilobal shaped extruded particles.

Moreover, a good $C_5$+ selectivity and a good stability is obtained. Further, the particles are sufficiently strong and can easily be made by extrusion.

The catalysts of the present invention, especially for use in the Fischer-Tropsch process comprise, as the catalytically active component, a metal from Group VIII of the Periodic Table of the Elements. Particular catalytically active metals include ruthenium, iron, cobalt and nickel, more preferably cobalt. Combinations of two or more components are also possible. Preferably, a Fischer-Tropsch catalyst is used which yields substantial quantities of paraffins, more preferably substantially unbranched paraffins.

A most suitable catalyst composition for this purpose includes a cobalt-containing Fischer-Tropsch catalyst. Such catalysts are described in the literature, see e.g. AU 698392 and WO 99/34917.

Preferred hydrocarbonaceous feeds for the preparation of synthesis gas are natural gas or associated gas. As these feedstocks usually result in synthesis gas having $H_2$/CO ratio's of close to 2, cobalt is a very good Fischer-Tropsch catalyst as the user ratio for this type of catalysts is also close to 2.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania, especially $TiO_2$.

The amount of catalytically active metal on the carrier for optimum performance is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB, VIB or Group VIIB of the Periodic Table of the Elements, or the actinides and lanthanides.

In particular, oxides of magnesium, calcium, strontium, barium, scandium, yttrium, lanthanum, titanium, zirconium, hafnium, cerium, thorium, uranium, vanadium, chromium and manganese are very suitable promoters. Particularly preferred metal oxide promoters for the catalyst used to prepare heavy parrafins are manganese, vanadium and zirconium oxide.

Suitable metal promoters may be selected from Groups VIIB or VIII of the Periodic Table of the Elements. Rhenium, silver and Group VIII noble metals are particularly suitable, with platinum and palladium being especially preferred.

The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum in view of their ability to produce long chain n-paraffins.

The catalytically active metal and the promoter, if present, may be deposited on the carrier material by any suitable treatment, such as impregnation, mixing/kneading and mixing/extrusion.

After deposition of the metal and, if appropriate, the promoter on the carrier material, the loaded carrier is typically subjected to calcination.

The effect of the calcination treatment is to remove crystal water, to decompose organic compounds and to convert inorganic compounds to their respective oxides.

After calcination, the resulting catalyst may be activated by contacting the catalyst with hydrogen or a hydrogen-containing gas, typically at temperatures of about 200 to 350° C.

Other processes for the preparation of Fischer-Tropsch catalysts comprise kneading/mulling, followed by extrusion, drying/calcination and activation.

The suitable material for the shaped catalyst particles should be processed in such a way that their intended shape is obtained.

One example of a processing method is an extrusion process, wherein a shapeable dough, preferably comprising one or more sources for one or more of the catalytically active elements, and optionally one or more sources for one or more of the promoters and the finely divided refractory oxide or refractory oxide precursor is mulled together with a suitable solvent. The mulled mixture is then extruded through an orifice in a die-plate. The resulting extrudates are dried.

The solvent for inclusion in the mixture may be any of the suitable solvents known in the art. Examples of suitable solvents include water; alcohols, such as methanol, ethanol and propanol; ketones, such as acetone; aldehydes, such as propanal; and aromatic solvents, such as toluene. A most convenient and preferred solvent is water, optionally in combination with methanol.

The use of specific die-plates enables the formation of the intended shape of the catalyst particles. Die-plates are well known in the art and can be made from metal or polymer material, especially a thermoplastic material.

The shaped particles of the invention are very useful as carriers for catalyst or catalyst precursors, which are used in mass-transfer or diffusion limited reactions, such as the Fischer-Tropsch hydrocarbon synthesis process.

The catalytic conversion process may be performed under conventional synthesis conditions known in the art.

Typically, the catalytic conversion may be effected at a temperature in the range of from 150 to 300° C., preferably from 180 to 260° C.

Typical total pressures for the catalytic conversion process are in the range of from 1 to 200 bar absolute, more preferably from 10 to 70 bar absolute.

In the catalytic conversion process especially more than 75 wt % of $C_5+$, preferably more than 85 wt % $C_5+$ hydrocarbons are formed.

Depending on the catalyst and the conversion conditions, the amount of heavy wax ($C_{20}+$) may be up to 60 wt %, sometimes up to 70 wt %, and sometimes even up to 85 wt %.

Preferably a cobalt catalyst is used, a low $H_2/CO$ ratio is used (especially 1.7, or even lower) and a low temperature is used (190-230° C.).

To avoid any coke formation, it is preferred to use a $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955. Preferably the Fischer-Tropsch hydrocarbons stream comprises at least 35 wt % $C_{30}+$, preferably 40 wt % $C_{30}+$, more preferably 50 wt % $C_{30}+$.

The Fischer-Tropsch process may be a slurry FT process or a fixed bed FT process, especially a multitubular fixed bed.

It has been found that the beds containing particles according to the invention have—in a random packing—a much higher voidage than beds containing the corresponding conventional trilobes when packed using the well known "sock loading" technique.

The voidage obtained when using the conventional trilobal shape amounts up to about 45% whereas use of the particles according to the present invention produces a voidage of at least 55% which makes such particles attractive for low pressure drop applications, for instance the Fischer-Tropsch synthesis process.

The catalyst particles described herein can also be formed as helical lobed particles.

The term helical lobed particles as used herein refers to an elongated shaped particle comprising two protrusions each extending from and attached to a central position, the central position being aligned along a longitudinal axis, the particle having a cross-section occupying the space encompassed by the outer edges of six circles around a central circle, each of the six circles bordering two neighboring circles while three alternating circles are equidistant to the central circle and may be attached to the central circle, minus the space occupied by the four remaining outer circles and including the four interstitial regions, which protrusions extend along and are helically wound about the longitudinal axis of the particle.

The term helical lobed particles as used herein can also refer to an elongated shaped particle comprising one to four additional protrusions, each attached to an existing protrusion as defined in claim 1, the additional protrusion being defined in the same way as in claim 1, the existing protrusion becoming the new central circle, the original central circle becoming the other protrusion which protrusions extend along and are helically wound about the longitudinal axis of the particle.

By employing helical lobed particles, a larger diameter helical lobed catalyst particle can be employed to achieve a given selectivity than is necessary when employing straight lobed particles, resulting in a greater reduction in pressure drop across the catalyst bed than expected from the prior art.

Alternatively, for a given design of fixed bed with a predetermined pressure drop, by employing the helical lobed particles in the Fischer-Tropsch process a substantially higher selectivity can be achieved than with the appropriate straight lobed particles necessary to meet the pressure drop requirements.

The invention will now be illustrated by means of the following non-limiting examples.

Example 1

Experiments were carried out to monitor the selectivity for $C_5+$ hydrocarbons in the Fischer-Tropsch process of catalyst particles made up of conventional trilobes (to be referred to hereinafter as TL) and of two types of particles particles having a shape according to the invention.

All three types of particles were obtained by extrusion of the same material, containing a catalytically active element, a promoter, a refractory oxide carrier and a water/methanol mixture, using an appropriate die plate.

Example I

Preparation of Trilobe-Shaped Catalyst Particles (Comparative)

Trilobe-shaped catalyst particles were prepared as follows. A mixture was prepared containing 143 g commercially available titania powder (P25 ex. Degussa), 66 g commercially available $Co(OH)_2$ powder, 10.3 g $Mn(Ac)_2.4H_2O$ and 38 g water. The mixture was kneaded for 15 minutes. The mixture was shaped using a Bonnot extruder. The resulting extrudates were dried and calcined. The resulting extrudates contained 20 wt % Co and 1 wt % Mn. The resulting catalyst particles had a trilobal shape having a nominal diameter of 1.7 mm (Catalyst A).

Example II

Preparation of Catalyst Particles According to the Invention

A mixture was prepared containing 143 g commercially available titania powder (P25 ex. Degussa), 66 g commercially available $Co(OH)_2$ powder, 10.3 g $Mn(Ac)_2.4H_2O$ and 38 g water. The mixture was kneaded for 15 minutes. The mixture was shaped using a Bonnot extruder equipped with an appropriate dieplate to obtain the desired shape as desired in claim 2. The resulting extrudates were dried and calcined. The resulting catalyst particles contained 20 wt % Co and 1 wt % Mn and had shapes as defined in claim 2 wherein the number of additional protrusions was one (catalyst B) or two (catalyst C)

Example III

Catalysts A, B and C were tested in a process for the preparation of hydrocarbons. Micro-flow reactors containing 10 ml of catalyst extrudates A, B and C, respectively, in the form of a fixed bed of catalyst particles, were heated to a temperature of 280° C., and pressurized with a continuous flow of nitrogen gas to a pressure of 2 bar abs. The catalysts were reduced in-situ for 24 hours with a mixture of nitrogen and hydrogen gas. During reduction the relative amount of hydrogen in the mixture was gradually increased from 0% to 100%. The water concentration in the off-gas was kept below 3000 ppmv.

Following reduction, the pressure was increased to 32 bara (STY 130) or 57 bara (STY 150). The reaction was carried out with a mixture of hydrogen and carbon monoxide. The space time yield (STY), expressed as grams hydrocarbon product per liter catalyst particles (including the voids between the particles) per hour, the $C_5+$ selectivity, expressed as a weight percentage of the total hydrocarbon product, and the $C_1$ selectivity, expressed as a weight percentage of the total hydrocarbon product were determined for each experiment after 50 hours of operation. The results are set out in Table I.

TABLE I

|  | STY g/lcat/h | Relative $C_5+$ selectivity (%) | Relative $C_1$ selectivity (%) |
| --- | --- | --- | --- |
| Catalyst B | 130 | 102.2 | 74.2 |
|  | 150 | 104.0 | 86.7 |
| Catalyst C | 130 | 100.2 | 77.4 |
|  | 150 | 114.8 | 78.6 |

In Table I, the results regarding $C_5+$ selectivity resulting from the use of catalysts B and C are expressed relative to the results obtained from the use of catalyst A (comparative catalyst), i.e. the $C_5+$ selectivity of catalyst A is taken to be 100%.

From the results it is clear that the catalyst particles of the present invention (B and C) show a higher selectivity for the formation of $C_5+$ hydrocarbons in the Fischer-Tropsch process, compared to the conventional TL trilobes (catalyst A).

In addition, the selectivity for unwanted $C_1$ products in the Fischer-Tropsch process is considerably lower using the catalyst particles according to the invention when compared to using the comparative catalyst.

The $C_5+$ selectivity of catalyst B and catalyst C is higher than that of catalyst A, and the $C_1$ selectivity is lower. The performance of catalysts B and C is better even though the amount of active material per volume reactor is smaller for these catalysts compared to catalyst A, due to the higher voidage. Thus, the specific shape of catalyst B and catalyst C particles enables a better use of the expensive catalyst material.

Example IV

Pressure Drop Experiments

The pressure drop in a catalyst bed packed with catalyst particles of catalyst B, with an average length of the particles of 4.5 mm, was compared to the pressure drop in a catalyst bed packed with catalyst particles of catalyst A, with an average length of the particles of 4.5 mm. The pressure drop in the catalyst bed packed with catalyst B particles was considerably lower: the pressure drop in a column packed with catalyst B was 79.9% of the pressure drop in a column packed with catalyst A. From this result it is clear that the shaped catalyst particles according to the invention offer advantages with respect to pressure drop compared to known shaped catalyst particles.

We claim:

1. A shaped catalyst or catalyst precursor containing a catalytically active component or a precursor thereof, supported on a carrier, which carrier is an elongated shaped particle comprising three to six protrusions, said particle comprising two protrusions, each protrusion extending from and attached to a central position, wherein the central position is aligned along the longitudinal axis of the particle, to which protrusions one to four additional protrusions are attached;

the cross-section of two protrusions attached to a central position occupying the space encompassed by the outer edges of six circles around a central circle, each of the six circles touching two neighbouring circles whilst two alternating circles are equidistant to the central circle and may be attached to the central circle and the two circles adjacent to the two alternating circles, but not the common circle touching the central circle, minus the space occupied by the four remaining outer circles and including four remaining interstitial regions;

the one to four additional protrusions, each attached to a protrusion as defined above, each being defined in the same way as above, the protrusion to which an additional protrusion is attached becoming the new central circle, and the original central circle becoming the other protrusion.

2. The shaped catalyst or catalyst precursor of claim 1 wherein the carrier comprises three or four protrusions;

said particle comprising two protrusions, each protrusion extending from and attached to a central position, wherein the central position is aligned along the longitudinal axis of the particle, to which protrusions one or two additional protrusions are attached.

3. The shaped catalyst or catalyst precursor of claim 1 having a cross-section wherein the three to six protrusions have diameters in the range between 0.74 and 1.3 times the diameter of the central circle.

4. The shaped catalyst or catalyst precursor of claim 1 having a cross-section wherein the three to six protrusions have diameters in the range between 0.87 and 1.15 times the diameter of the central circle.

5. The shaped catalyst or catalyst precursor of claim 1 in which the angle between the two lines connecting the centers of three adjacent circles is between 90° and 180° or between 270° and 180°.

6. The shaped catalyst or catalyst precursor of claim 1 in which the angle between the two lines connecting the centers of three adjacent circles is between 110° and 150° or between 210° and 250°.

7. The shaped catalyst or catalyst precursor of claim 1 wherein the component is selected from the group consisting of elements of Group VIII of the Periodic Table of the Elements.

8. The shaped catalyst or catalyst precursor of claim 7 wherein the carrier is a refractory oxide.

9. The shaped catalyst or catalyst precursor of claim 7 containing an element or compound selected from the group consisting of Group IIA, IIIB, IVB, VB, VIB, VIIB and VIII of the Periodic Table of the Elements.

10. The shaped catalyst or catalyst precursor of claim 1 wherein the catalyst has been made by extrusion.

11. The shaped catalyst of claim 1 wherein the component is cobalt.

12. The shaped catalyst of claim 1 wherein the carrier is selected from the group consisting of silica, alumina and titania.

13. The shaped catalyst of claim 1 wherein the component is cobalt and the carrier is titania.

\* \* \* \* \*